US011264870B2

(12) United States Patent
Zhou et al.

(10) Patent No.: US 11,264,870 B2
(45) Date of Patent: Mar. 1, 2022

(54) METHOD AND DEVICE FOR ACQUIRING MECHANICAL POSITION OF ELECTRIC MOTOR

(71) Applicant: SZ DJI TECHNOLOGY CO., LTD., Shenzhen (CN)

(72) Inventors: Zhenhao Zhou, Shenzhen (CN); Zihan Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 36 days.

(21) Appl. No.: 16/832,166

(22) Filed: Mar. 27, 2020

(65) Prior Publication Data

US 2020/0227983 A1 Jul. 16, 2020

Related U.S. Application Data

(63) Continuation of application No. PCT/CN2017/108692, filed on Oct. 31, 2017.

(51) Int. Cl.
  *G01D 5/245* (2006.01)
  *H02K 11/215* (2016.01)
  *H02P 6/17* (2016.01)

(52) U.S. Cl.
  CPC .............. *H02K 11/215* (2016.01); *H02P 6/17* (2016.02)

(58) Field of Classification Search
  CPC ........ H02K 11/215; H02P 6/17; G01D 5/2451
  See application file for complete search history.

(56) References Cited

U.S. PATENT DOCUMENTS

| 6,316,848 B1 * | 11/2001 | Rohner ................. H02K 41/02 310/12.19 |
| 6,700,279 B1 * | 3/2004 | Uchiyama ............ H02K 21/046 310/190 |
| 2007/0046122 A1 | 3/2007 | Makiuchi et al. |
| 2015/0137718 A1 | 5/2015 | Liu et al. |

(Continued)

FOREIGN PATENT DOCUMENTS

| CN | 1293484 A | 5/2001 |
| CN | 101071122 A | 11/2007 |
| CN | 201113744 Y | 9/2008 |

(Continued)

OTHER PUBLICATIONS

The World Intellectual Property Organization (WIPO) International Search Report for PCT/CN2017/108692 dated May 2, 2018 7 Pages.

*Primary Examiner* — Cortez M Cook
(74) *Attorney, Agent, or Firm* — Anova Law Group, PLLC

(57) ABSTRACT

A method of obtaining a mechanical position of a motor for an ESC includes obtaining magnetic field strengths of two or more Hall sensors respectively and determining the mechanical position of the motor based on the magnetic field strengths of the two or more Hall sensors. The magnetic field strengths are obtained by measuring a magnetic leakage of two or more pairs of magnetic poles by the two or more Hall sensors. The motor includes two or more Hall sensors and two or more pairs of magnetic poles. The motor is connected to the ESC; a phase difference between the two or more Hall sensors is a preset angle; and arrangements between each pair of magnetic poles and the two or more Hall sensors are different.

18 Claims, 8 Drawing Sheets

(56) References Cited

U.S. PATENT DOCUMENTS

2015/0153154 A1* 6/2015 Nishi .................. G01D 5/2451
382/203

FOREIGN PATENT DOCUMENTS

| CN | 101707879 A | | 5/2010 |
|----|-------------|---|--------|
| CN | 101820190 A | | 9/2010 |
| CN | 105452554 A | | 3/2016 |
| JP | 2007252097 A | * | 9/2007 |

* cited by examiner

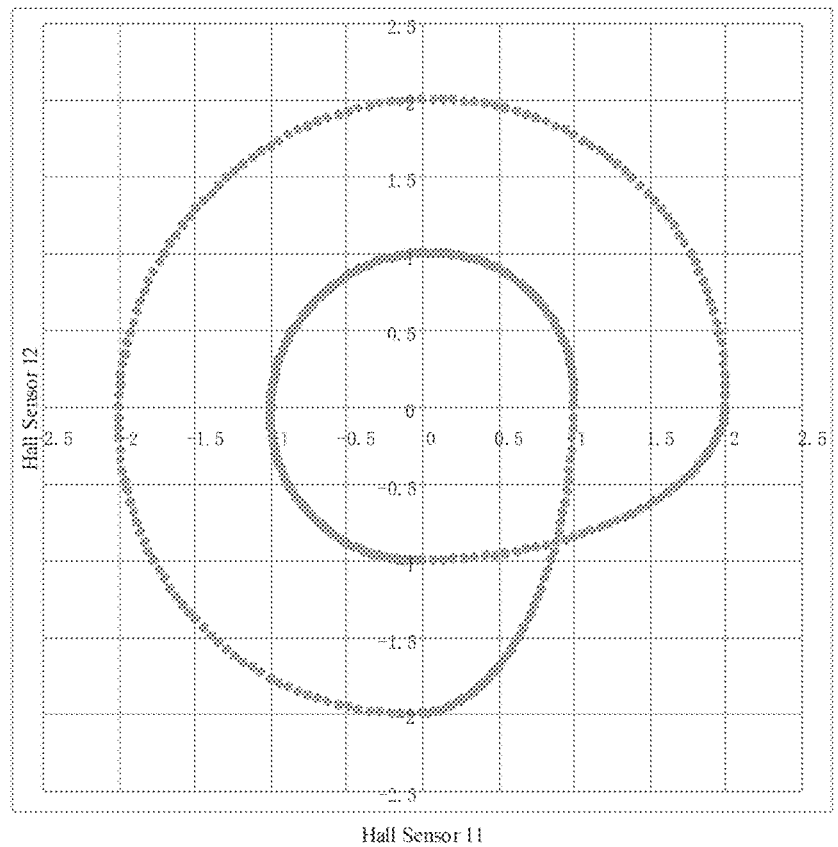

FIG. 2B

Step 301: Obtaining magnetic field strengths of at least two Hall sensors respectively, the magnetic field strengths being obtained by measuring the magnetic leakage of the at least two pairs of magnetic poles by the at least two Hall sensors Step 302: Determining the mechanical position of the motor based on the magnetic field strengths of the at least two Hall sensors

FIG. 3

METHOD AND DEVICE FOR ACQUIRING MECHANICAL POSITION OF ELECTRIC MOTOR

CROSS-REFERENCE TO RELATED APPLICATION

This application is a continuation of International Application No. PCT/CN2017/108692, filed Oct. 31, 2017, the entire content of which is incorporated herein by reference.

TECHNICAL FIELD

The disclosure relates to electronic technology, and in particular relates to a method and a device for obtaining a mechanical position of a motor.

BACKGROUND

Servo motor refers to the motor that controls the operation of mechanical components in the servo system. The servo motor can control speed and position accurately, and it can convert the voltage signal into torque and speed to drive the controlled object. The rotor speed of the servo motor is controlled by the input signal and can respond quickly. It is configured as an actuator in an automatic control system, and has the characteristics such as small electromechanical time constant, high linearity, or having a starting voltage. The servo motor may include the permanent magnet servo motor. The rotor of the permanent magnet servo motor is a permanent magnet. The U/V/W three-phase electricity controlled by the driver forms an electromagnetic field, and the rotor rotates under the action of this magnetic field. Permanent magnet servo motors can be applied in consumer unmanned aerial vehicles (UAVs), e.g., in a camera stabilized three-axis gimbal.

The acquisition of the mechanical position of the permanent magnet servo motor usually implements a manner of adding an additional position sensor, such as adding a photoelectric encoder, a grating incremental encoder, a magnetic encoder, a magnetic reluctance rotary transformer, etc. The position sensor is disposed separately from the electromagnetic part of the motor and has high reliability. However, the disposition of such position sensor causes the system cost of arrangement of the permanent magnet servo motor to be relatively high, and increases the volume and weight of the permanent magnet servo motor system.

SUMMARY

In accordance with the disclosure, there is provided a method of obtaining a mechanical position of a motor for an electronic speed control (ESC). The method may include obtaining magnetic field strengths of two or more Hall sensors respectively, and determining the mechanical position of the motor based on the magnetic field strengths of the two or more Hall sensors. The magnetic field strengths may be obtained by measuring a magnetic leakage of two or more pairs of magnetic poles by the two or more Hall sensors. The motor may include two or more Hall sensors and two or more pairs of magnetic poles. The motor may be connected to the ESC; a phase difference between the two or more Hall sensors may be a preset angle; and arrangements between each pair of magnetic poles and the two or more Hall sensors may be different.

Also in accordance with the disclosure, there is provided a motor. The motor may include two or more Hall sensors, and two or more pairs of magnetic poles. A phase difference between the at least two Hall sensors may be a preset angle, and arrangements may be different between each pair of the magnetic poles and the two or more Hall sensor. The motor may be connected to an ESC, and the two or more Hall sensors may be configured to: measure a magnetic leakage of the two or more pairs of magnetic poles to obtain magnetic field strengths of the two or more Hall sensors, respectively; and send the magnetic field strengths of the two or more Hall sensors to the electronic speed control, the electronic speed control determining a mechanical position of the motor based on the magnetic field strengths of the two or more Hall sensors.

Also in accordance with the disclosure, there is provided a gimbal. The gimbal may include a fixing mechanism, a shaft arm mounted on the gimbal by the fixing mechanism, an ESC mounted on the gimbal by the fixing mechanism, and a motor. The ESC may be connected to the motor. The motor may include two or more Hall sensors and two or more pairs of magnetic poles. A phase difference between the two or more Hall sensors may be a preset angle, and arrangements between each pair of the magnetic pols and the two or more Hall sensors may be different. The two or more Hall sensors may be configured to: measure a magnetic leakage of the two or more pairs of magnetic poles to obtain magnetic field strengths of the two or more Hall sensors, respectively; and send the magnetic field strengths of the two or more Hall sensors to the ESC, the ESC determining a mechanical position of the motor based on the magnetic field strengths of the two or more Hall sensors. The ESC may include a processor and a memory for storing program codes. When executed, the program codes may cause the processor to: obtain magnetic field strengths of two or more Hall sensors respectively, the magnetic field strengths being obtained by measuring a magnetic leakage of two or more pairs of magnetic poles by the two or more Hall sensors; and determine a mechanical position of the motor based on the magnetic field strengths of the two or more Hall sensors.

BRIEF DESCRIPTION OF THE DRAWINGS

FIG. 2B illustrates a map of the magnetic field strengths of Hall sensors inside the motor;

FIG. 3 illustrates a flowchart of a method for obtaining a mechanical position of a motor according to a first embodiment of the present disclosure;

DETAILED DESCRIPTION OF THE EMBODIMENTS

In order to make the objectives, technical solutions, and advantages of the embodiments of the present disclosure clearer, the technical solutions in the embodiments of the present disclosure will be clearly and completely described with reference to the accompanying drawings in the embodiments of the present disclosure. Obviously, the described embodiments are a part, but not all, of the embodiments of the present disclosure. Based on the embodiments of the present disclosure, all other embodiments obtained by a person of ordinary skill in the art without creative efforts shall fall within the protected scope of the present disclosure.

Figure 1:
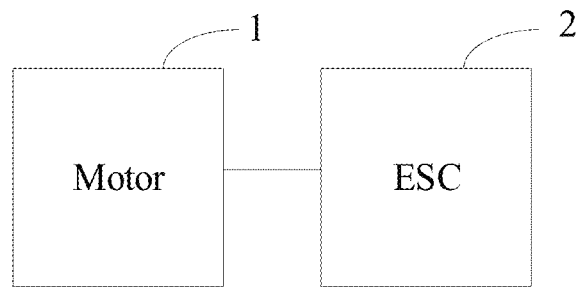
FIG. 1 is a schematic diagram of an application scenario of a method for obtaining a mechanical position of a motor according to the present disclosure.

FIG. 1 is a schematic diagram of an application scenario of a method for obtaining a mechanical position of a motor according to the present disclosure. As shown in FIG. 1, the application scenario includes a motor 1 and an electronic speed control (ESC) 2, where the motor 1 is connected to the ESC 2. Specifically, the motor may include at least two Hall sensors and at least two pairs of magnetic poles, a phase difference between the at least two Hall sensors is a preset angle, and arrangements between each pair of magnetic poles and the at least two Hall sensors are different. The motor 1 measures the magnetic leakage of the at least two pairs of magnetic poles through the at least two Hall sensors, obtains the magnetic field strengths of the at least two Hall sensors, and sends the magnetic field strengths of the at least two Hall sensors to the ESC 2. The ESC 2 determines the mechanical position of motor 1 based on the magnetic field strengths of the at least two Hall sensors, so as to determine the mechanical position of the motor based on the magnetic leakage of the magnet inside the motor, which may improve the servo performance of the motor.

The implementations of the different arrangements between each pair of magnetic poles and the at least two Hall sensors may include different distances between each pair of magnetic poles and the at least two Hall sensors. A specific implementation manner may be: the magnets corresponding to the respective pairs of the magnetic poles have different lengths, or the heights of the at least two Hall sensors in an axial direction are different, or the magnets corresponding to the respective pairs of the magnetic poles have different magnetic strengths, or the magnets corresponding to the respective pairs of the magnetic poles employ different magnetic mediums. The characteristic of arrangements between each pair of magnetic poles and the at least two Hall sensors provides a physical basis for the method for obtaining the mechanical position of the motor according to some embodiments of the present disclosure.

The basic principle of determining a mechanical angle of the motor based on detecting the magnetic leakage of the magnet inside the motor is: because at least two Hall sensors with phase difference are arranged, the magnetic leakage of the at least two pairs of magnetic poles can be detected respectively. At the same moment, the magnetic field strengths detected by the at least two Hall sensors are different. And because the arrangements between each pair of magnetic poles and the at least two Hall sensors are different, in different electrical cycles of the motor, the amplitudes of the magnetic field strength waveforms of the magnetic leakage detected by the Hall sensors are different, so that the mechanical position can be determined based on the magnetic field strengths detected by at least two Hall sensors, and the efficiency of determining the mechanical position may be improved, thereby improving the servo performance of the motor.

Figure 2A:
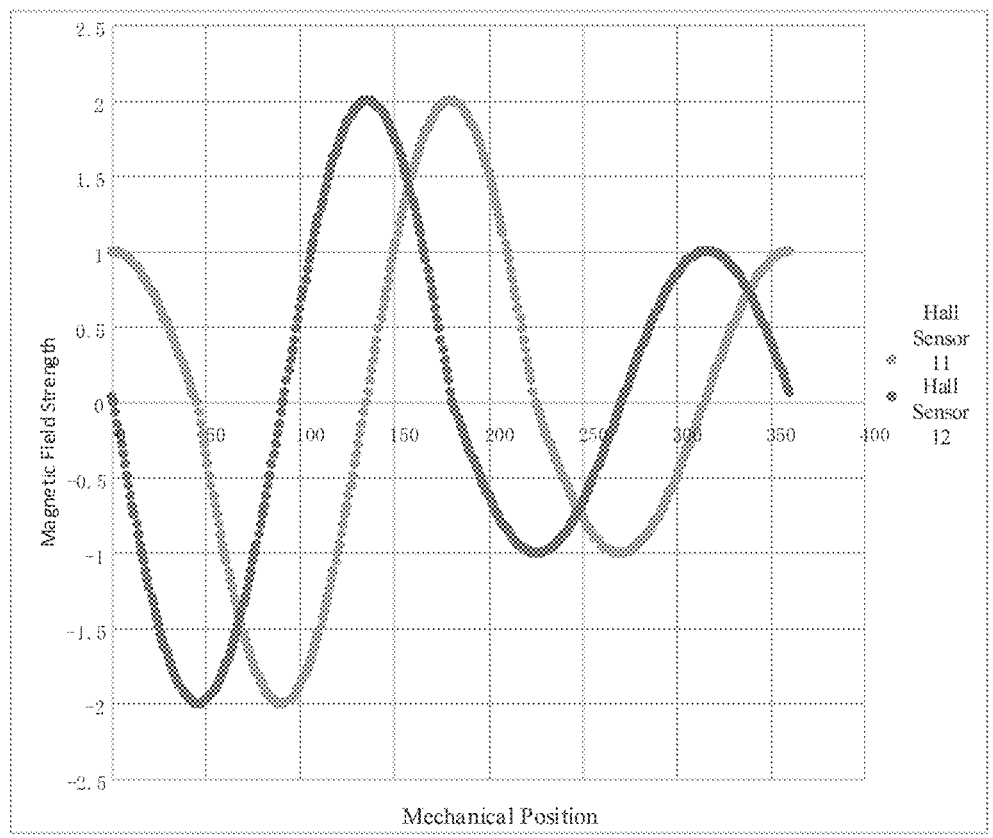
FIG. 2A is a magnetic field strength waveform diagram of Hall sensors inside a motor according to an embodiment of the present disclosure with two pairs of poles.

In order to clearly explain the basic principles of the above implementation, two pairs of magnetic poles and two Hall sensors are taken as examples to illustrate. FIG. 2A is a magnetic field strength waveform diagram of Hall sensors inside a motor according to an embodiment of the present disclosure with two pairs of poles, and FIG. 2B illustrates a map of the magnetic field strengths of Hall sensors inside the motor. As shown in FIG. 2A, two curves represent magnetic field strength waveform diagrams of the Hall sensor 11 and the Hall sensor 12, where the horizontal axis is the mechanical position and the vertical axis is the magnetic field strength. As shown in FIG. 2A, since there is a phase difference between the Hall sensor 11 and the Hall sensor 12 inside the motor. Here, a phase difference, 90 degrees is taken as an example. When the mechanical position is 0, the magnetic field strength read by the Hall sensor 11 is 1, and the magnetic field strength read by the Hall sensor 12 is 0. When the mechanical position is 0, the magnetic field strength read by the Hall sensor 11 is 0, and the magnetic field strength read by the Hall sensor 12 is −2, that is, because there is a 90 degree phase difference between the Hall sensor 11 and the Hall sensor 12 inside the motor, the magnetic field strength waveforms of the magnetic leakage read by the two sensors also have a phase difference of 90 degrees. Because the arrangements between each pair of magnetic poles and the Hall sensor 11 and Hall sensor 12 are different, as shown in FIG. 2A, in the first electrical cycle, the amplitudes of the magnetic field strength waveforms of the Hall sensor 11 and the Hall sensor 12, that is, the maximum amplitude of the magnetic field strength, are different from the amplitudes of the magnetic field strength waveforms of the Hall sensor 11 and the Hall sensor 12 in the second electrical cycle. For example, as shown in FIG. 2A, in the first electrical cycle, the amplitude of the magnetic field strength waveform is 2, and in the second electrical cycle, the amplitude of the magnetic field strength waveform is 1. Mapping the magnetic field strength shown in FIG. 2A, the waveform diagram shown in FIG. 2B can be obtained, where the horizontal axis is a reading of the Hall sensor 11 and the vertical axis is a reading of the Hall sensor 12. Each point in FIG. 2B corresponds to a different mechanical position, so that the mechanical position is determined according to the magnetic field strengths detected by at least two Hall sensors, and the efficiency of determining the mechanical position may be improved, thereby improving the servo performance of the motor.

It should be appreciated that the method for obtaining the mechanical position of the motor according to an embodiment of the present disclosure can also reduce the system cost, volume, and weight.

Below several specific embodiments are used to explain a method for obtaining a mechanical position of a motor of the present disclosure.

FIG. 3 illustrates a flowchart of a method for obtaining a mechanical position of a motor according to a first embodiment of the present disclosure. The motor in this embodiment employs the motor as shown in FIG. 1. The method in this embodiment may specifically be applied to a device for obtaining a mechanical position of a motor. The device for obtaining a mechanical position of the motor may be disposed in the ESC. As shown in FIG. 3, the method in this embodiment may include:

Step 301: Obtaining magnetic field strengths of at least two Hall sensors respectively, the magnetic field strengths being obtained by measuring the magnetic leakage of the at least two pairs of magnetic poles by the at least two Hall sensors.

The at least two Hall sensors may be two, three, four, etc., and each of the Hall sensors is configured to detect magnetic leakage and obtain magnetic field strength. Taking two Hall sensors as an example for illustration, the magnetic field strengths of the two Hall sensors, e.g., x1 and x2, are respectively obtained.

Specifically, the ESC can receive the magnetic field strengths of at least two Hall sensors sent by the motor.

Step 302: Determining the mechanical position of the motor based on the magnetic field strengths of the at least two Hall sensors.

The mechanical position of the motor can also be referred to as a mechanical angle or an absolute angle.

An implementable manner of the above step 302 is to determine the mechanical position of the motor according to the magnetic field strengths of the at least two Hall sensors and a preset mapping relationship. The preset mapping relationship includes value of multiple magnetic field strengths and a mechanical position corresponding to the value of each magnetic field strength. The value of each magnetic field strength includes value of multiple dimensions, and the number of dimensions is equal to the number of the at least two Hall sensors.

The preset mapping relationship may be a mapping table. The above two Hall sensors are taken as an example for further illustration. Each row of the mapping table includes two values. The mapping table may include multiple rows. Each row of the mapping table corresponds to a mechanical position, the number of rows of the mapping table is associated with the measurement accuracy of the mechanical position. When the magnetic field strengths of the two Hall sensors, e.g., x1 and x2, are obtained, the corresponding mechanical positions of x1 and x2 are determined in the mapping table.

The preset mapping relationship may also be a mapping function, and the mechanical position may be determined based on the magnetic field strengths of the at least two Hall sensors and the mapping function. The above two Hall sensors are taken as an example for further illustration. This mapping function may be presented as y=f(x1, x2). When the magnetic field strengths of the two Hall sensors are obtained, for example, x1 and x2, the corresponding mechanical position y is determined according to y=f(x1, x2).

The preset mapping relationship may also be a preset waveform diagram. Each point in the preset waveform diagram corresponds to a mechanical position. The above two Hall sensors are taken as an example to further illustrate the preset waveform diagram as shown in FIG. 2B. It is shown that when the magnetic field strengths of the two Hall sensors, e.g., x1 and x2, are obtained, a mechanical position corresponding to a coordinate point with a horizontal value, x1, and a vertical value, x2, is determined in the preset waveform diagram.

In this embodiment, the magnetic field strengths of at least two Hall sensors are respectively obtained, and the magnetic field strengths are obtained by measuring the magnetic leakage of the at least two pairs of magnetic poles by the at least two Hall sensors, and the mechanical position of the motor is determined based on the magnetic field strengths of the at least two Hall sensors, so that the mechanical position of the motor is determined based on detecting the magnetic leakage of the magnet inside the motor, which can improve the servo performance of the motor.

Below several specific embodiments are used to describe in detail the technical solution of the method embodiment shown in FIG. 3.

Figure 4:
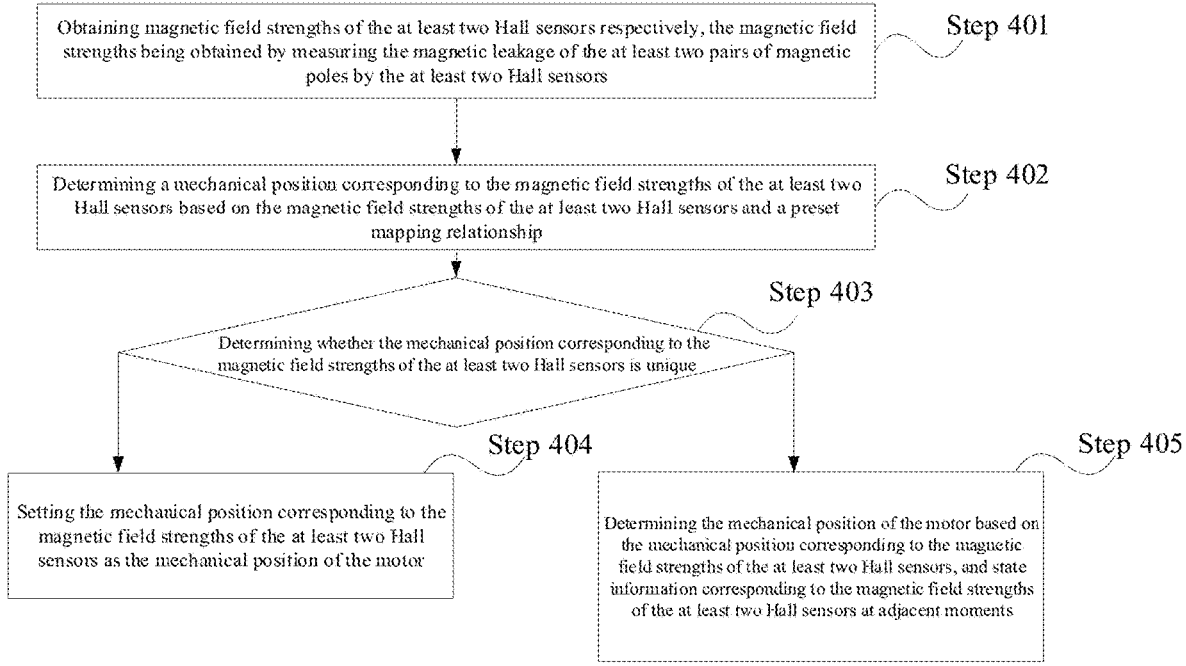
FIG. 4 illustrates a flowchart of a method for obtaining a mechanical position of a motor according to a second embodiment of the present disclosure.

FIG. 4 illustrates a flowchart of a method for obtaining a mechanical position of a motor according to a second embodiment of the present disclosure. In this embodiment, based on the embodiment shown in FIG. 3, the preset mapping relationship further includes state information corresponding to the values of the multiple magnetic field strengths. As shown in FIG. 4, the method in this embodiment may include:

Step 401: Obtaining magnetic field strengths of the at least two Hall sensors respectively, the magnetic field strengths being obtained by measuring the magnetic leakage of the at least two pairs of magnetic poles by the at least two Hall sensors.

Step 402: Determining a mechanical position corresponding to the magnetic field strengths of the at least two Hall sensors based on the magnetic field strengths of the at least two Hall sensors and a preset mapping relationship.

Taking FIG. 2B as an example for further illustration. As shown in FIG. 2B, there is an intersection point, that is, a coincidence point, and all points except the coincidence point correspond to a single mechanical position, but the coincident point corresponds to more one than one mechanical position. When the mechanical position corresponding to the magnetic field strengths of the at least two Hall sensors is located at the coincident point, due to the non-uniqueness, the state information may be used for further determination.

Step 403: Determining whether the mechanical position corresponding to the magnetic field strengths of the at least two Hall sensors is unique; performing Step 404 when the mechanical position corresponding to the magnetic field strengths of the at least two Hall sensors is a unique value, and performing step 405 when the mechanical positions corresponding to the magnetic field strengths of the at least two Hall sensors are more than one.

Step 404: Setting the mechanical position corresponding to the magnetic field strengths of the at least two Hall sensors as the mechanical position of the motor;

Step 405: Determining the mechanical position of the motor based on the mechanical position corresponding to the magnetic field strengths of the at least two Hall sensors, and state information corresponding to the magnetic field strengths of the at least two Hall sensors at adjacent moments.

Optionally, the state information corresponding to the multiple magnetic field strengths is determined based on a preset state position, and the number of the preset state positions is equal to the pair number of the magnetic poles.

In this embodiment, the magnetic field strengths of the at least two Hall sensors are obtained respectively, and the magnetic field strengths are obtained by measuring the magnetic leakage of the at least two pairs of magnetic poles by the at least two Hall sensors. The mechanical position corresponding to the magnetic field strengths of the at least two Hall sensors is determined based on the magnetic field strengths of the at least two Hall sensors and the preset mapping relationship, and whether the mechanical position corresponding to the magnetic field strengths is unique may be determined. When the mechanical position corresponding to the magnetic field strengths of the at least two Hall sensors is a unique value, the mechanical position corresponding to the magnetic field strengths of the at least two Hall sensors is set as the mechanical position of the motor. When the mechanical positions corresponding to the magnetic field strengths of at least two Hall sensors are more than one, the mechanical position of the motor is determined based on the mechanical positions corresponding to the magnetic field strengths of the at least two Hall sensors and the state information corresponding the magnetic fields of the at least two Hall sensors at adjacent moments, so as to determine the mechanical position of the motor based on detecting the magnetic leakage of the magnet inside the motor, and improve the performance of the servo motor.

By setting the state information, the problem that the magnetic field strengths of the two Hall sensors correspond to multiple mechanical positions is avoided.

Figure 5:
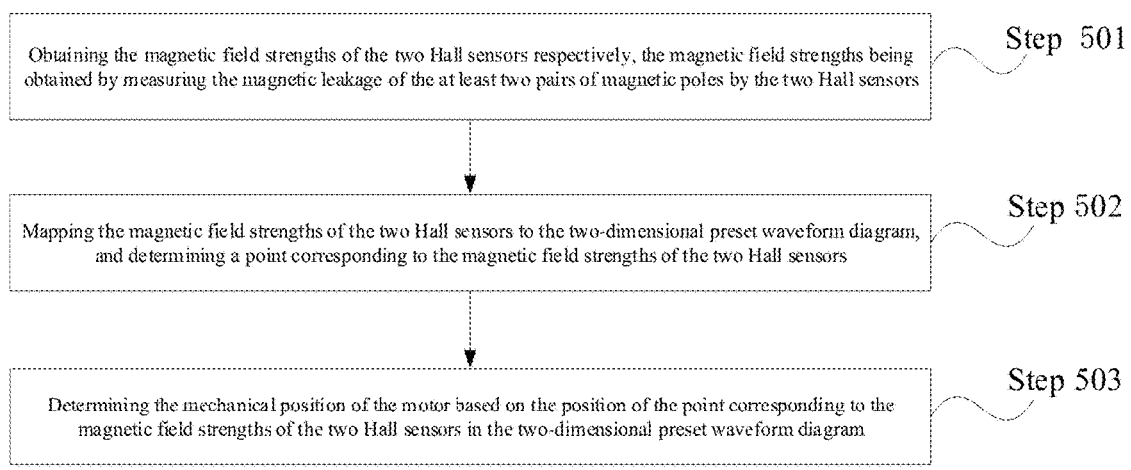
FIG. 5 illustrates a flowchart of a method for obtaining a mechanical position of a motor according to a third embodiment the present disclosure.

FIG. 5 illustrates a flowchart of a method for obtaining a mechanical position of a motor according to a third embodiment the present disclosure. As shown in FIG. 5, this embodiment takes an example that the motor includes two Hall sensors, and the preset mapping relationship is a two-dimensional preset waveform. The method in this embodiment may include:

Step 501: Obtaining the magnetic field strengths of the two Hall sensors respectively, the magnetic field strengths being obtained by measuring the magnetic leakage of the at least two pairs of magnetic poles by the two Hall sensors.

Step 502: Mapping the magnetic field strengths of the two Hall sensors to the two-dimensional preset waveform diagram, and determining a point corresponding to the magnetic field strengths of the two Hall sensors.

A horizontal position and a vertical position of each point in the two-dimensional preset waveform diagram respectively represent a value of a magnetic field strength, and each point in the two-dimensional preset waveform diagram corresponds to a mechanical position. The dimensional preset waveform diagram includes at least two loops of curves (for example, which is shown as a continuous curve with two loops in FIG. 2B), and the at least two loops of curves have a coincident point. The number of loops of the curves is equal to the pair number of the at least two pairs of magnetic poles.

When the motor includes two pairs of magnetic poles, the two-dimensional preset waveform diagram is the waveform diagram as shown in FIG. 2B. When the motor includes four pairs of magnetic poles, the two-dimensional preset waveform is shown in FIG. 6B.

Figure 6A:
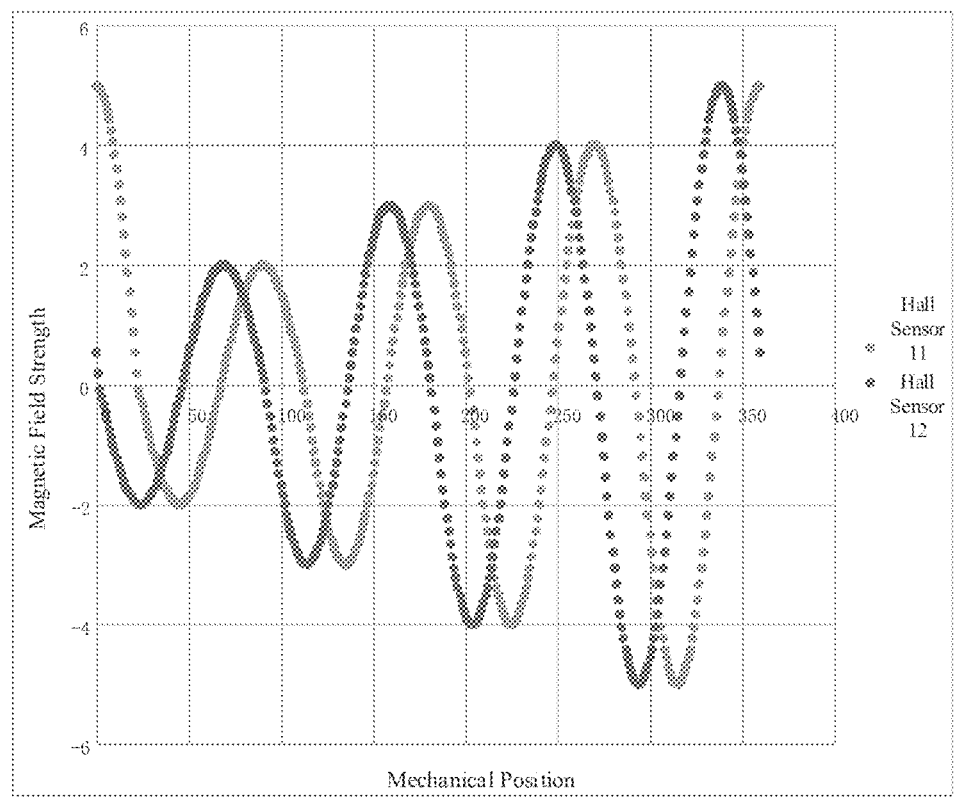
FIG. 6A is a magnetic field strength waveform diagram of a Hall sensor inside a motor according to an embodiment of the present disclosure with four pairs of poles.
Figure 6B:
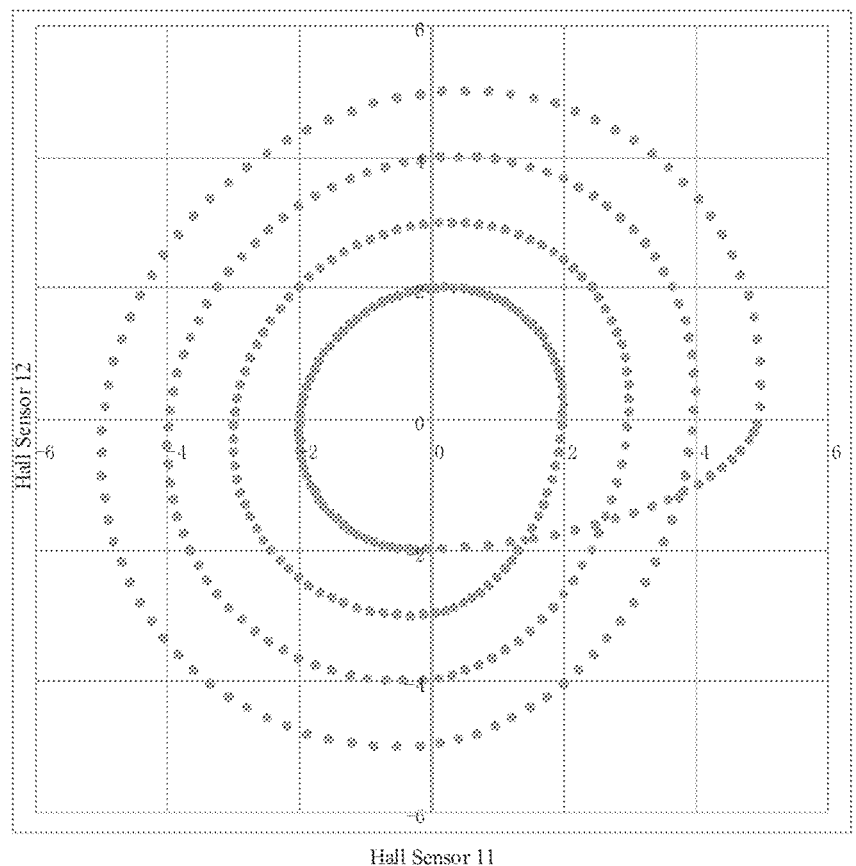
FIG. 6B illustrates a map of the magnetic field strength of a Hall sensor inside the motor.

FIG. 6A is a magnetic field strength waveform diagram of Hall sensors inside a motor according to an embodiment of the present disclosure with four pairs of poles, and FIG. 6B illustrates a map of the magnetic field strengths of Hall sensors inside the motor. Taking the above-mentioned Hall sensor 11 and Hall sensor 12 as an example for further illustration, the two curves in FIG. 6A represent the magnetic field strength waveform diagrams of Hall sensor 11 and Hall sensor 12, respectively, where the horizontal axis is the mechanical position, and the vertical axis is the magnetic field strength. As shown in FIG. 6A, due to the phase difference between the Hall sensor 11 and the Hall sensor 12 inside the motor, the magnetic field strengths waveform of the magnetic leakage read by the two sensors also have a phase difference, and further due to different arrangements between each pair of the magnetic poles and the Hall sensor 11 and the Hall sensor 12, as shown in FIG. 6A, in the first electrical cycle, the amplitude of the magnetic field strength waveform of the Hall sensor 11 and the Hall sensor 12, that is, the maximum value of the magnetic field strength is different from the amplitude of the magnetic field strength waveforms of the Hall sensor 11 and the Hall sensor 12 in the second electrical cycle, the third electrical cycle, and the fourth electrical cycle. The magnetic field strength shown in FIG. 6A can be mapped to obtain the waveform diagram shown in FIG. 6B, where the horizontal axis is the reading of the Hall sensor 11 and the vertical axis is the reading of the Hall sensor 12. Each point in FIG. 6B corresponds to a different mechanical position, which can uniquely determine a mechanical position based on the magnetic field strength detected by two Hall sensors, so as to improve the efficiency of determining the mechanical position, and then effectively improve the servo performance of the motor.

It should be appreciated that according to the principles disclosed in the two-dimensional preset waveform diagrams of the two pairs of magnetic poles and the four pairs of magnetic poles, other two-dimensional preset waveform diagrams of more pairs of magnetic poles have the same design principle, which are not illustrated here.

Step 503: Determining the mechanical position of the motor based on the position of the point corresponding to the magnetic field strengths of the two Hall sensors in the two-dimensional preset waveform diagram.

Optionally, the preset mapping relationship may further include at least two calibration points, that is, the above two-dimensional preset waveform diagram includes at least two calibration points, and the number of calibration points is equal to the pair number of the at least two pairs of magnetic poles. The at least two calibration points are respectively located on different loops of the curves in the two-dimensional preset waveform diagram, and a distance between the at least two calibration points and the coincident point is greater than a first preset value. The distance between the at least two calibration points is greater than a second preset value. The first preset value and the second preset value can be flexibly selected as needed.

For example, when the motor includes two pairs of magnetic poles, the number of the at least two calibration points is two, and when the motor includes four pairs of magnetic poles, the number of the at least two pairs of calibration points is four.

Figure 7A:
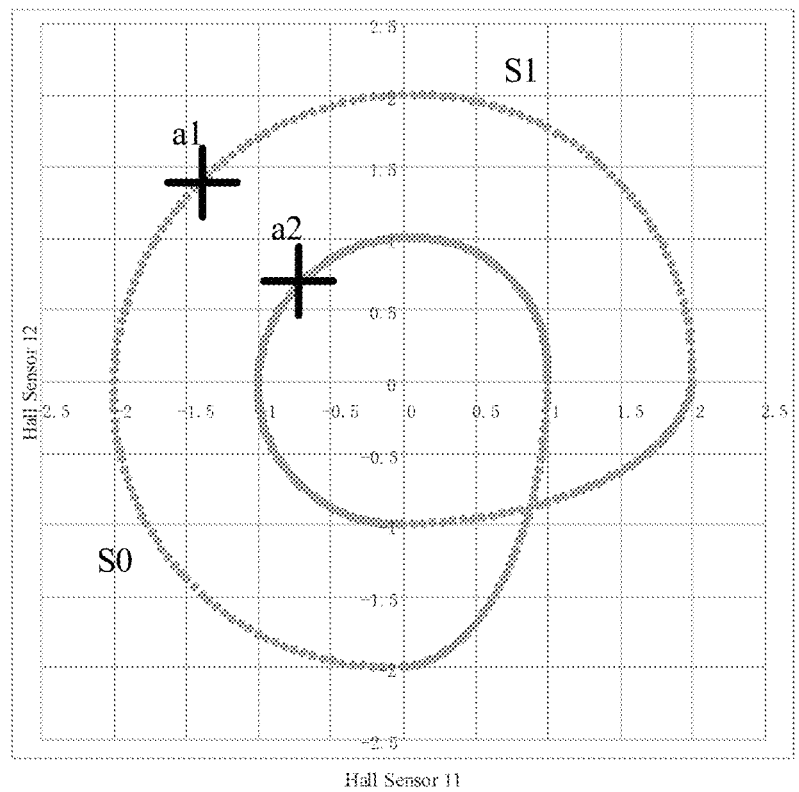
FIG. 7A is a two-dimensional preset waveform diagram of two pairs of poles.
Figure 7B:
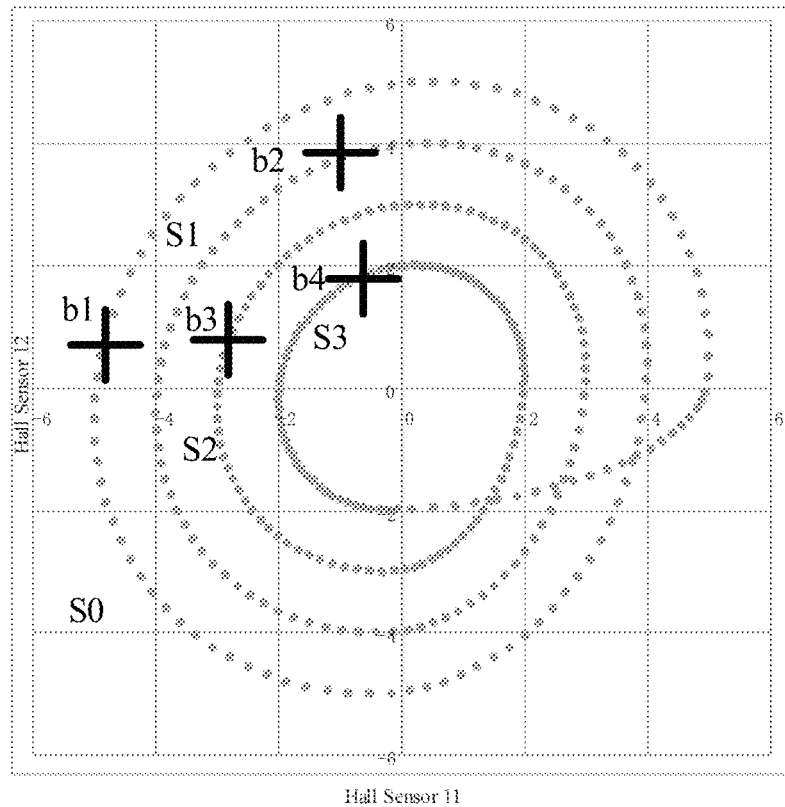
FIG. 7B is a two-dimensional preset waveform diagram of four pairs of poles.

Any point located on the curve between the calibration points of the two adjacent loops of curves have the same state information. FIG. 7A is a two-dimensional preset waveform diagram of two pairs of poles, and FIG. 7B is a two-dimensional preset waveform diagram of four pairs of poles. As shown in FIG. 7A, when the motor includes two pairs of magnetic poles, the two-dimensional preset waveform diagram includes two calibration points a1 and a2, and a1 and a2 divide the two-dimensional preset waveform into two segments, S0 and S1, respectively. Each point included in the S0 segment has the same state information, each point included in the S1 segment has the same state information, and the state information of the S0 segment and the state information of the S1 segment are different. Taking the state information including binary digit information as an example for illustration, the state information of each point included in the S0 segment may be 0, and the state information of each point included in the S1 segment may be 1. As shown in FIG. 7B, when the motor includes four pairs of magnetic poles, the two-dimensional preset waveform diagram includes four calibration points b1, b2, b3, and b4. The b1, b2, b3, and b4 divide the two-dimensional preset waveform into four segments, S0, S1, S2, and S3. Each point included in the S0 segment has the same state information, each point included in the S1 segment has the same state information, each point included in the S2 segment has the same state information, each point included in the S3 segment has the same state information, and the state information for adjacent segments are different.

Optionally, the coincident point and the at least two calibration points satisfy the following conditions: when the coincident point is in a fourth quadrant, the at least two calibration points are in a second quadrant; when the coincident point is in a third quadrant, the at least two calibration points are in a first quadrant; when the coincident point is in the second quadrant, the at least two calibration points are in the fourth quadrant; when the coincident point is in the first quadrant, the at least two calibration points are located in a third quadrant.

Optionally, in a specific implementable manner of step 503, whether the point corresponding to the magnetic field strengths of the two Hall sensors coincide with the coincidence point may be determined. When the point corresponding to the magnetic field strengths of the two Hall sensors do not coincide with the coincident point, the mechanical position of the point corresponding to the magnetic field strengths of the two Hall sensors is set as the mechanical position of the motor. When the point corresponding to the magnetic field strengths of the two Hall sensors coincide with the coincidence point, the mechanical position of the motor is determined based on the point corresponding to the magnetic field strengths of the two Hall sensors and the state information of the point corresponding to the magnetic fields of the two Hall sensors at adjacent moments.

The mechanical position of the motor is determined based on the point corresponding to the magnetic field strengths of the two Hall sensors and a state information of the point corresponding to the magnetic field strengths of the two Hall sensors at adjacent moments. Specifically, the method includes: setting the state information of the point corresponding to the magnetic field strengths of the two Hall sensors at adjacent moments as the state information of the point corresponding to the magnetic field strengths of the two Hall sensors at the current moment; The mechanical position of the motor is determined based on the state information of the point corresponding to the magnetic field strengths of the two Hall sensors and the point corresponding to the magnetic field strengths of the two Hall sensors at the current moment.

In this embodiment, the magnetic field strengths of the two Hall sensors are obtained respectively, and the magnetic field strengths are obtained by measuring the magnetic leakage of the at least two pairs of magnetic poles by the two Hall sensors. The magnetic field strengths of the two Hall sensors are mapped into the two-dimensional preset waveform diagram for determining the point corresponding to the magnetic field strengths of the two Hall sensors, and the mechanical position of the motor the point is determined based on the point corresponding to the magnetic field strengths of the two Hall sensors in the two-dimensional preset waveform diagram, so that the mechanical position of the motor can be determined based on detecting the magnetic leakage of the magnet inside the motor, and the servo performance of the motor can be improved.

By setting the state information, the problem that the point corresponding to the magnetic field strengths of the two Hall sensors correspond to multiple mechanical positions is avoided.

Figure 8:
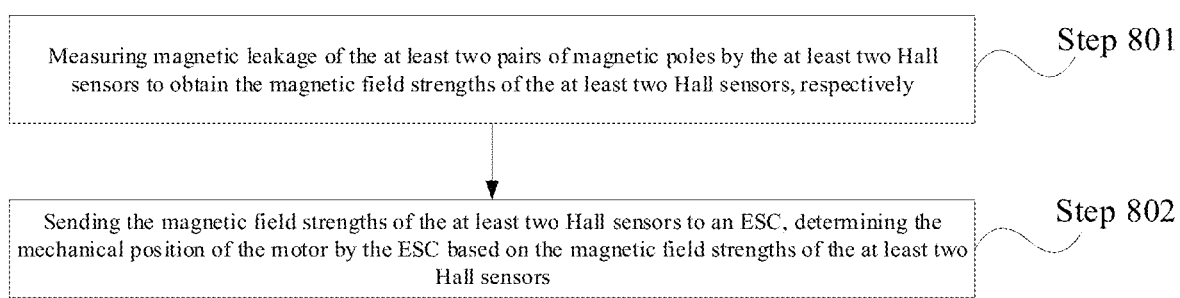
FIG. 8 illustrates a flowchart of a method for obtaining a mechanical position of a motor according to a fourth embodiment of the present disclosure.

FIG. 8 illustrates a flowchart of a method for obtaining a mechanical position of a motor according to a fourth embodiment of the present disclosure. In this embodiment, the motor is connected to the ESC. The motor employs the motor described in FIG. 1. The method in this embodiment is applied to the motor. As shown in FIG. 8, the method in this embodiment may include:

Step 801: Measuring magnetic leakage of the at least two pairs of magnetic poles by the at least two Hall sensors to obtain the magnetic field strengths of the at least two Hall sensors, respectively.

Step 802: Sending the magnetic field strengths of the at least two Hall sensors to an ESC, determining the mechanical position of the motor by the ESC based on the magnetic field strengths of the at least two Hall sensors.

In this embodiment, the magnetic leakage of the at least two pairs of magnetic poles is measured by the at least two Hall sensors, and the magnetic field strengths of the at least two Hall sensors are obtained, respectively. The magnetic field strengths are sent to the ESC, and the magnetic field strengths of the at least two Hall sensors are used for the ESC to determine the mechanical position of the motor, so that the mechanical position of the motor can be determined based on detecting the magnetic leakage of the magnet inside the motor, and the servo performance of the motor can be improved.

Figure 9:
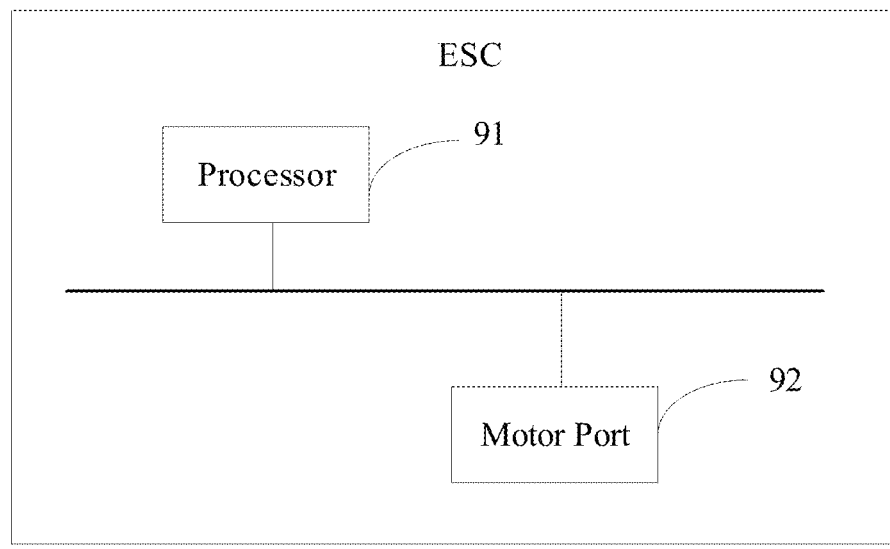
FIG. 9 is a schematic structural diagram of an electronic speed control according to an embodiment of the present disclosure.

FIG. 9 is a schematic structural diagram of an ESC according to an embodiment of the present disclosure. The ESC of this embodiment is connected to a motor. The motor includes at least two Hall sensors and at least two pairs of magnetic poles. The phase difference between the at least two Hall sensors is a preset angle, and the arrangements between each pair of the magnetic poles and the Hall sensors are different. As shown in FIG. 9, the ESC of this embodiment may include a processor 91, and the processor 91 is configured to obtain magnetic field strengths of the at least two Hall sensors respectively. The magnetic field strengths are obtained by measuring the magnetic leakage of the at least two pairs of magnetic poles by the at least two Hall sensors, and the mechanical position of the motor is determined based on the magnetic field strengths of the at least two Hall sensor.

It can be appreciated that the ESC may further include a motor port 92, which is connected to the motor and configured to output a driving signal to control the rotation of a rotor of the motor.

In a possible implementation manner, the processor 91 may be specifically configured to determine the mechanical position of the motor based on the magnetic field strengths of the at least two Hall sensors and a preset mapping relationship. The preset mapping relationship includes values of multiple magnetic field strengths and the mechanical positions corresponding to the value of each magnetic field strength. The value of each magnetic field strength includes value of multiple dimensions. The value of each magnetic field corresponds to the value in each dimension. The number of the dimensions is equal to the number of the at least two Hall sensors.

Optionally, the preset mapping relationship further includes a state information corresponding to the values of the multiple magnetic field strengths.

In a possible implementation manner, the processor 91 may be specifically configured to determine a mechanical position corresponding to the magnetic field strengths of the at least two Hall sensors based on the magnetic field strengths of the at least two Hall sensors and a preset mapping relationship. When the mechanical position corresponding to the magnetic field strengths of the at least two Hall sensors is a unique value, the mechanical position corresponding to the magnetic field strengths of the at least two Hall sensors is set as the mechanical position of the motor; when the mechanical positions corresponding to the magnetic field strengths of at least two Hall sensors are more than one, the mechanical position of the motor is determined based on the mechanical positions corresponding to the magnetic field strengths of the at least two Hall sensors and the state information corresponding the magnetic field strengths of the at least two Hall sensors at adjacent moments.

Optionally, the state information corresponding to the multiple magnetic field strengths is determined based on a preset state position, and the number of the preset state positions is equal to the pair number of the at least two pairs of magnetic poles.

Optionally, when the number of the at least two Hall sensors is two, the preset mapping relationship includes a two-dimensional preset waveform diagram, and a horizontal position and a vertical position of each point in the two-dimensional preset waveform diagram respectively represents a value of a magnetic field strength. Each point in the two-dimensional preset waveform diagram corresponds to a mechanical position, the two-dimensional preset waveform diagram includes at least two loops of curves (for example, which is shown as a continuous curve with two loops in FIG. 2B), and the at least two loops of curves has a coincidence point. The number of the loops of the curves is equal to the pair number of the at least two pairs of magnetic poles. The processor 91 may be specifically configured to: map the magnetic field strengths of the two Hall sensors into the two-dimensional preset waveform diagram, determine a point corresponding to the magnetic field strengths of the two Hall sensors; and determine the mechanical position of the motor based on the position of the point corresponding to the magnetic field strengths of the at least two Hall sensors in the two-dimensional preset waveform diagram.

Optionally, the preset mapping relationship further includes at least two calibration points, the number of the at least two calibration points is equal to the pair number of the at least two pairs of magnetic poles, and the at least two calibration points are respectively located at different loops of the curves in the two-dimensional preset waveform diagram, and the distance between the at least two calibration points and the coincident point is greater than the first preset value, and the distance between the at least two calibration points is greater than the second preset value; any point on the curve between the calibration points located on two adjacent loops of the curves has the same state information.

Optionally, the coincident point and the at least two calibration points satisfy the following conditions: when the coincident point is in the fourth quadrant, the at least two calibration points are in the second quadrant; when the coincident point is in the third quadrant, the at least two calibration points are in the first quadrant; when the coincident point is in the second quadrant, the at least two calibration points are in the fourth quadrant; and when the coincident point is in the first quadrant, the at least two calibration points are located in the third quadrant.

Optionally, the processor 91 may be specifically configured to: in response to the point corresponding to the magnetic strengths of the two Hall sensors not coinciding with the coincidence point, set the point corresponding to the magnetic field strengths of the two Hall sensors as the mechanical position of the motor; in response to the point corresponding to the magnetic field strengths of the two Hall sensors coinciding with the coincidence point, determine the mechanical position of the motor based on the point corresponding to the magnetic field strengths of the two Hall sensors, and the state information of the point corresponding to the magnetic field strengths of the two Hall sensors at adjacent moments.

Determining the mechanical position of the motor based on the point corresponding to the magnetic field strengths of the two Hall sensors, and the state information of the point corresponding to the magnetic fields of the two Hall sensors at adjacent moments may include: the state information of the point corresponding to the magnetic field strengths of the two Hall sensors at adjacent moments is set as the state information of the point corresponding to the magnetic field strengths of the two Hall sensors at the current moment, and the mechanical position of the motor is determined based on the state information of the point corresponding to the magnetic field strengths of the sensors and the point corresponding to the magnetic field strengths of the two Hall sensors at the current moment.

Optionally, the state information includes binary digit information, and the binary digit information is 0 or 1.

The ESC of this embodiment may be configured to implement the technical solutions of the foregoing method embodiments, and the implementation principles and technical effects thereof are similar, and details are not described herein again.

Figure 10:
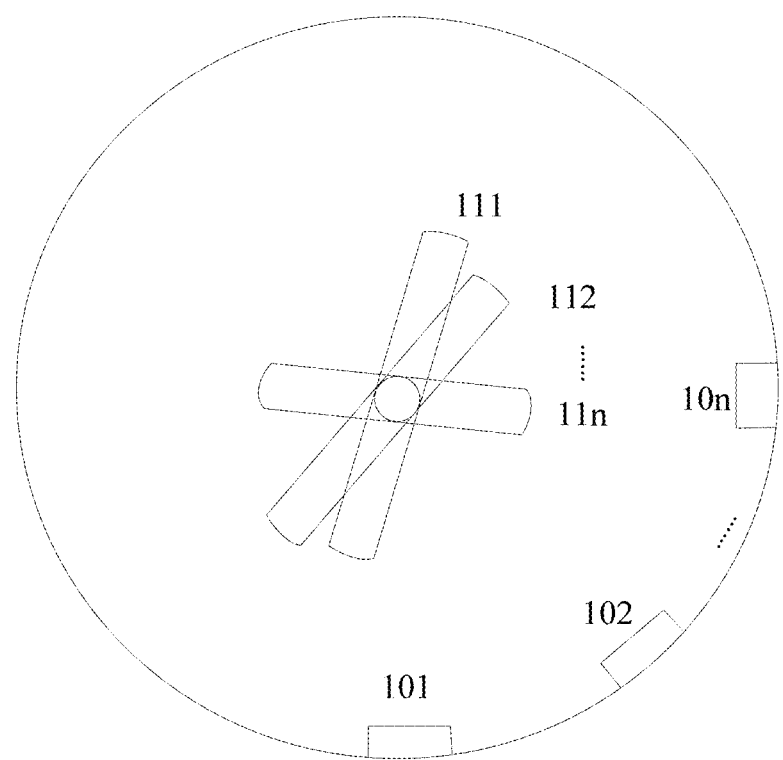
FIG. 10 is a schematic structural diagram of a motor according to an embodiment of the present disclosure.

FIG. 10 is a schematic structural diagram of a motor according to an embodiment of the present disclosure. The motor is connected to an ESC. As shown in FIG. 10, the motor includes at least two Hall sensors (101, 102, . . . , 10$n$) and at least two pairs of magnetic poles (111, 112, . . . , 11$n$), phase difference between the at least two Hall sensors (101, 102, . . . , 10$n$) is a preset angle, and the arrangements between each pair of the magnetic poles and the Hall sensors are different. The at least two Hall sensors are configured to: measure the magnetic leakage of the at least two pairs of magnetic poles to obtain the magnetic field strengths of the at least two Hall sensors respectively; and send the magnetic field strengths of the at least two Hall sensors to the ESC, and determine the mechanical position of the motor by the ESC based on the magnetic field strengths of the at least two Hall sensors.

Optionally, the magnets corresponding to respective pair of the magnetic poles have different lengths.

Optionally, the heights of the at least two Hall sensors in the axial direction are different.

Optionally, the magnets corresponding to respective pair of the magnetic poles have different magnetic strengths.

Optionally, the magnets corresponding to respective pair of magnetic poles employ different magnetic mediums.

The motor of this embodiment may be configured to implement the technical solutions of the foregoing method embodiments, and the implementation principles and technical effects thereof are similar, and details are not described herein again.

An embodiment of the present disclosure further provides a power system. The power system of this embodiment includes an ESC and a motor. The ESC may adopt the structure of the device in the embodiment of FIG. 9, and correspondingly, the technical solution of the foregoing method embodiment may be implemented. The implementation principle and technical effect are similar, details are not described herein again. The motor may adopt the structure of the device in the embodiment of FIG. 10, and correspondingly, the technical solution of the foregoing method embodiment may be implemented. The implementation principles and technical effects thereof are similar, details are not described herein again.

An embodiment of the present disclosure further provides a gimbal. The gimbal includes a fixing mechanism, a shaft arm, an ESC as shown in FIG. 9, and a motor as shown in FIG. 10. Correspondingly, the technical solutions of the foregoing method embodiments can be implemented, and the implementation principles and technical effects thereof are similar, details are not described herein again.

An embodiment of the present disclosure also provides a UAV. The UAV includes a body, an ESC as shown in FIG. 9, and a motor as shown in FIG. 10. Correspondingly, the technical solutions of the foregoing method embodiments can be implemented, and the implementation principles and technical effects thereof are similar, and details are not described herein again.

The above integrated unit implemented in the form of a software functional unit may be stored in a computer-readable storage medium. The above software functional unit is stored in a storage medium and includes several instructions for causing a computer device (which may be a personal computer, a server, or a network device) or a processor to execute some steps of the methods described in the embodiments of the present disclosure. The foregoing storage medium includes: flash drive, movable hard disk, read-only memory (ROM), random-access memory (RAM), magnetic disk, compact disc, or other mediums that can store program codes.

Those skilled in the art can clearly understand that for the convenience and brevity of the description, the division of the above-mentioned functional modules is only used as an example. In practical applications, the above-mentioned functions can be allocated to different functional modules to complete as needed. The internal structure is divided into different functional modules to complete all or part of the functions described above. For the specific operating process of the device described above, reference may be made to the corresponding processes in the foregoing method embodiments, and details are not described herein again.

Finally, it should be noted that the above embodiments are only used to illustrate, but not to limit the technical solution of the present disclosure. Although the present disclosure has been described in detail with reference to the foregoing embodiments, those skilled in the art should understand that the technical solutions described in the foregoing embodiments can still be modified, or some or all of the technical features can be equivalently substituted; and that these modifications or substitutions do not depart the essence of the corresponding technical solutions from the scope of the technical solutions in the embodiments of the present disclosure.

What is claimed is:

1. A method of obtaining a mechanical position of a motor for an ESC, comprising:
   obtaining magnetic field strengths of two or more Hall sensors respectively of the motor, the magnetic field strengths being obtained by measuring a magnetic leakage of two or more pairs of magnetic poles of the motor by the two or more Hall sensors; and
   determining the mechanical position of the motor based on the magnetic field strengths of the two or more Hall sensors, including:
      determining the mechanical position of the motor based on the magnetic field strengths of the two or more Hall sensors and a preset mapping relationship, the preset mapping relationship comprising values for a plurality of magnetic field strengths and mechanical positions corresponding to the value of each magnetic field strength, the value for each magnetic field strength comprising value of multiple dimensions, and a number of the dimensions being equal to a number of the two or more Hall sensors;
   wherein:
      the motor is connected to the ESC;
      a phase difference between the two or more Hall sensors is a preset angle; and
      arrangements between each pair of magnetic poles and the two or more Hall sensors are different.

2. The method according to claim 1, wherein the preset mapping relationship further comprises state information corresponding to the values of the plurality of magnetic field strengths.

3. The method according to claim 2, wherein determining the mechanical position of the motor based on the magnetic field strengths of the two or more Hall sensors and the preset mapping relationship comprises:
   determining the mechanical position corresponding to the magnetic field strengths of the two or more Hall sensors based on the magnetic field strengths of the two or more Hall sensors and the preset mapping relationship;
   in response to the mechanical position corresponding to the magnetic field strengths of the two or more Hall sensors being a unique value, using the mechanical position corresponding to the magnetic field strengths of the two or more Hall sensors as the mechanical position of the motor; and
   in response to more than one mechanical positions corresponding to the magnetic field strengths of the two or more Hall sensors, determining the mechanical position of the motor based on the mechanical positions corresponding to the magnetic field strengths of the two or more Hall sensors and the state information of the magnetic field strengths of the two or more Hall sensors at adjacent moments.

4. The method according to claim 2, wherein the state information corresponding to the plurality of magnetic field strengths is determined based on a preset state position, and a number of the preset state positions is equal to a pair number of the magnetic poles.

5. The method according to claim 1, wherein:
   in response to the number of the Hall sensors being two, the preset mapping relationship comprises: a two-dimensional preset waveform diagram, a horizontal coordinate and a vertical coordinate of each point in the two-dimensional preset waveform diagram respectively representing a value of a magnetic field strength, each point in the two-dimensional preset waveform diagram corresponding to a mechanical position, the two-dimensional preset waveform diagram comprising at least two loops of curves, the at least two loops of curves having a coincident point, a number of the at least two loops of the curves being equal to the pair number of the magnetic poles; and
   determining a mechanical position of the motor based on the magnetic field strengths of the two or more Hall sensors comprises:
      mapping the magnetic field strengths of the two Hall sensors to the two-dimensional preset waveform diagram to determine a point corresponding to the magnetic field strengths of the two Hall sensors; and
      determining the mechanical position of the motor based on a position of the point corresponding to the magnetic field strengths of the two Hall sensors in the two-dimensional preset waveform diagram.

6. The method according to claim 5, wherein the preset mapping relationship further comprises:

two or more calibration points respectively located on different loops of the curve in the two-dimensional preset waveform diagram, a number of the two or more calibration points being equal to the pair number of the magnetic poles, a distance between each of the two or more calibration points and the coincident point being greater than a first preset value, a distance between the two or more calibration points being greater than a second preset value, and any point on the curve between the calibration points of two adjacent loops has a same state information.

7. The method according to claim 6, wherein the coincident point and the two or more calibration points satisfy a condition:
in response to the coincident point being located in a fourth quadrant, the two or more calibration points are located in a second quadrant;
in response to the coincident point being located in a third quadrant, the two or more calibration points are located in a first quadrant;
in response to the coincident point being located in the second quadrant, the two or more calibration points are located in the fourth quadrant; and
in response to the coincident point being located in the first quadrant, the two or more calibration points are located in the third quadrant.

8. The method according to claim 6, wherein determining the mechanical position of the motor based on a position of the point corresponding to the magnetic field strengths of the two Hall sensors in the two-dimensional preset waveform diagram comprises:
setting the mechanical position of the point corresponding to the magnetic field strengths of the two Hall sensors as the mechanical position of the motor, in response to the point corresponding to the magnetic field strengths of the two Hall sensors not coinciding with the coincident point.

9. The method according to claim 6, wherein determining the mechanical position of the motor based on the position of the point corresponding to the magnetic field strengths of the two Hall sensors in the two-dimensional preset waveform diagram comprises:
determining the mechanical position of the motor based on the point corresponding to the magnetic field strengths of the two Hall sensors and the state information of the point corresponding to the magnetic field strengths of the two Hall sensors at adjacent moments, in response to the point corresponding to the magnetic field strengths of the two Hall sensors coinciding with the coincidence point.

10. The method according to claim 9, wherein determining the mechanical position of the motor based on the point corresponding to the magnetic field strengths of the two Hall sensors and the state information of the point corresponding to the magnetic field strengths of the two Hall sensors at adjacent moments comprises:
setting the state information of the point corresponding to the magnetic field strengths of the two Hall sensors at adjacent moments as the state information of the point corresponding to the magnetic field strengths of the two Hall sensors at a current time; and
determining the mechanical position of the motor based on the state information of the point corresponding to the magnetic field strengths of the two Hall sensors and the point corresponding to the magnetic field strengths of the two Hall sensors at the current time.

11. The method according to claim 6, wherein the state information comprises binary digit information, and the piece of binary digit information is 0 or 1.

12. A motor, comprising:
two or more Hall sensors, and
two or more pairs of magnetic poles, a phase difference between the at least two Hall sensors being a preset angle, arrangements being different between each pair of the magnetic poles and the two or more Hall sensor,
wherein the motor is connected to an ESC, and the two or more Hall sensors are configured to:
measure a magnetic leakage of the two or more pairs of magnetic poles to obtain magnetic field strengths of the two or more Hall sensors, respectively; and
send the magnetic field strengths of the two or more Hall sensors to the ESC, the ESC determining a mechanical position of the motor based on the magnetic field strengths of the two or more Hall sensors and a preset mapping relationship, the preset mapping relationship comprising values for a plurality of magnetic field strengths and mechanical positions corresponding to the value of each magnetic field strength, the value for each magnetic field strength comprising value of multiple dimensions, and a number of the dimensions being equal to a number of the two or more Hall sensors.

13. The motor according to claim 12, wherein magnets corresponding to respective pairs of the magnetic poles have different lengths.

14. The motor according to claim 12, wherein heights of the two or more Hall sensors in an axial direction are different.

15. The motor according to claim 12, wherein magnets corresponding to respective pairs of magnetic poles have different magnetic strengths.

16. The motor according to claim 12, wherein magnets corresponding to respective pairs of the magnetic poles employ a different magnetic medium.

17. A gimbal, comprising:
a fixing mechanism,
a shaft arm mounted on the gimbal by the fixing mechanism,
an ESC mounted on the gimbal by the fixing mechanism, and
a motor, the ESC being connected to the motor, the motor comprising: two or more Hall sensors and two or more pairs of magnetic poles, a phase difference between the two or more Hall sensors being a preset angle, and arrangements between each pair of the magnetic poles and the two or more Hall sensors being different,
wherein the two or more Hall sensors are configured to:
measure a magnetic leakage of the two or more pairs of magnetic poles to obtain magnetic field strengths of the two or more Hall sensors, respectively; and
send the magnetic field strengths of the two or more Hall sensors to the ESC, the ESC determining a mechanical position of the motor based on the magnetic field strengths of the two or more Hall sensors; and
the ESC comprises: a processor and a memory for storing program codes, when executed, the program codes causing the processor to:
obtain magnetic field strengths of two or more Hall sensors respectively, the magnetic field strengths being obtained by measuring a magnetic leakage of two or more pairs of magnetic poles by the two or more Hall sensors; and determine a mechanical position of the motor based on the magnetic field strengths of the two or more Hall sensors, including:
  determining the mechanical position of the motor based on the magnetic field strengths of the two or more Hall sensors and a preset mapping relationship, the preset mapping relationship comprising values for a plurality of magnetic field strengths and mechanical positions corresponding to the value of each magnetic field strength, the value for each magnetic field strength comprising value of multiple dimensions, and a number of the dimensions being equal to a number of the two or more Hall sensors.

18. The gimbal according to claim 8, wherein:
in response to the number of the Hall sensors being two, the preset mapping relationship comprises: a two-dimensional preset waveform diagram, a horizontal coordinate and a vertical coordinate of each point in the two-dimensional preset waveform diagram respectively representing a value of a magnetic field strength, each point in the two-dimensional preset waveform diagram corresponding to a mechanical position, the two-dimensional preset waveform diagram comprising at least two loops of curves, the at least two loops of curves having a coincident point, the number of the at least two loops of the curves being equal to the pair number of the magnetic poles; and
determining a mechanical position of the motor based on the magnetic field strengths of the two or more Hall sensors comprises:
  mapping the magnetic field strengths of the two Hall sensors to the two-dimensional preset waveform diagram to determine a point corresponding to the magnetic field strengths of the two Hall sensors; and
  determining the mechanical position of the motor based on a position of the point corresponding to the magnetic field strengths of the two Hall sensors in the two-dimensional preset waveform diagram.

* * * * *